INVENTOR Fukuo Shibata

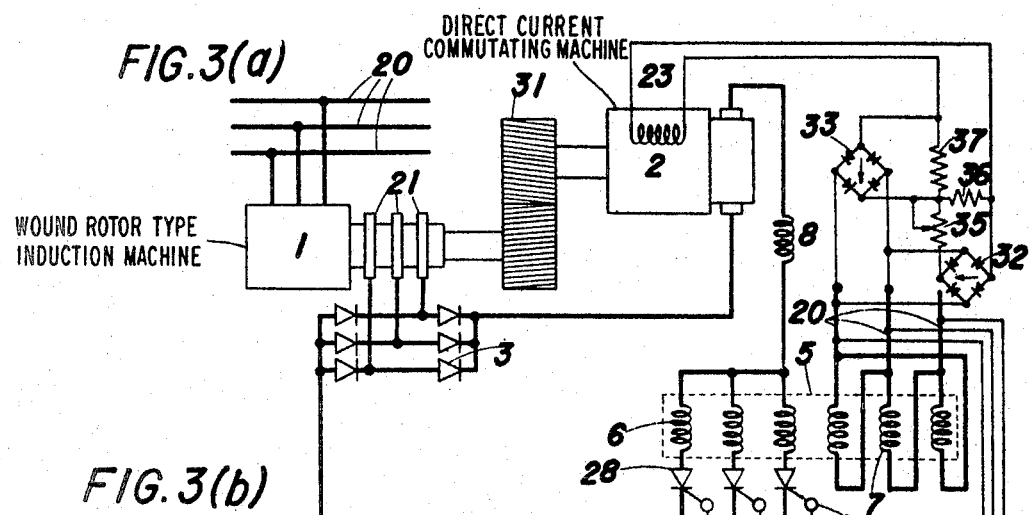
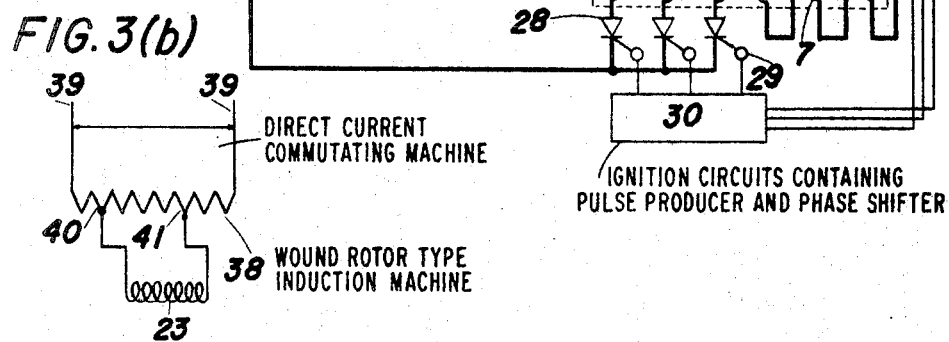
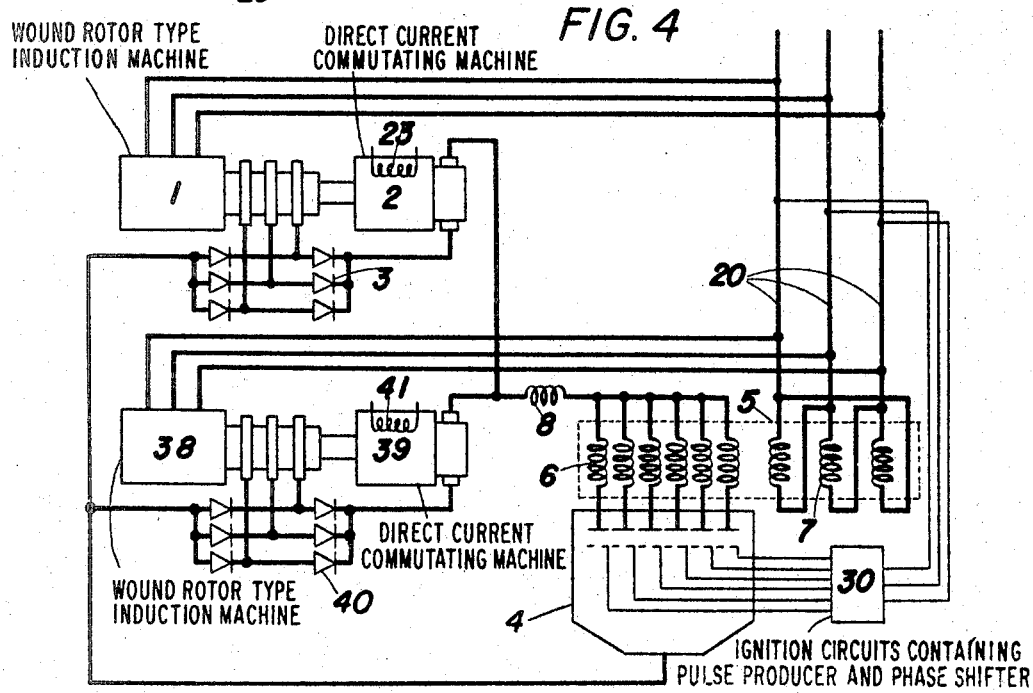

INVENTOR Fukuo Shibata

United States Patent Office 3,488,567
Patented Jan. 6, 1970

3,488,567
ELECTRIC CONTROL SYSTEMS FOR WOUND ROTOR TYPE INDUCTION MACHINES COUPLED WITH DIRECT CURRENT COMMUTATING MACHINES
Fukuo Shibata, 13 Tokiwa-cho, Hyoga Prefecture, Nishinomiya, Japan
Filed Jan. 21, 1965, Ser. No. 427,185
Claims priority, application Japan, Jan. 23, 1964, 39/2,928
Int. Cl. H02k 1/26
U.S. Cl. 318—197
10 Claims

ABSTRACT OF THE DISCLOSURE

A first converter has control elements and a main circuit which is electrically connected in series with a direct current circuit of a second converter and an armature circuit of a direct current commutating machine. Further, a transformer winding is connected in series with the second converter, the armature circuit of said direct current commutating machine and said first converter being connected with the alternating current supply. The direct current commutating machine is connected with a secondary winding of an induction motor whose rotor is coupled mechanically to the rotor of the direct current machine whereby the induction motor is controlled.

---

This invention relates to electric machine control systems, and it has particular relation to systems for controlling the speed of wound rotor type induction machines by auxiliary direct current commutating machines.

In this invention, it is defined that a wound rotor type induction machine is an induction machine in which the secondary circuit consists of poly-phase winding or coils whose terminals are either short circuited or closed through suitable circuits. An induction machine is an asynchronous machine which comprises a magnetic circuit interlinked with an electric circuit, rotating with respect to each other and in which power is transferred by electromagnetic induction. In this invention, examples of induction machines are induction generators, induction motors and electric couplings which are devices for transmitting torque by means of electromagnetic force in which there is no mechanical torque contact between the driven and driving members. The slip type electric coupling has poles excited by direct current on one rotating member, and an armature winding on the other rotating member. In this invention, it is also defined that a direct current commutating machine comprises a magnetic field excited from a direct current source or formed of permanent magnets, an armature and a commutator connected therewith. Specific types of direct current commutating machines are: direct current generators and motors.

In arrangements of this invention, the secondary output terminals of wound rotor induction machines are electrically connected to commutators of direct current commutating machines through converters. In this invention, it is defined that a converter is a device used to change alternating current power to direct current power. Therefore, static converters and rotary converters are examples of converters; and examples of static converters are units which employ static switching or rectifying devices such as semiconductor or metallic rectifiers with or without control elements, mercury arc rectifiers, electron tubes or magnetic amplifiers.

In the control of induction machines by auxiliary direct current commutating machines, it is important to provide control systems by which the induction machines can be controlled over wide speed ranges without sacrificing efficiency of operation, and economy of apparatus of the systems.

Heretofore, various arrangements have been devised which permit the control of induction machines by employing converters or rectifiers and auxiliary direct current commutating machines which are electrically connected with the secondary windings of the main induction machines and whose rotors are "mechanically coupled" to those of the main induction machines. In this specification, it is defined that the words "to couple mechanically" is to connect the objects so that the mechanical torque or power can be transferred between the objects by mechanical torque contact touching, for instance, with direct coupler (with bolt, pin etc.), with rubber, with belt, with gear, with chain, with magnetic clutch, with rail and wheels, with the load.

In general, these above arrangements are called by the name of Kraemer Systems. Some of these arrangements accomplish the desired speed control, but have necessitated the use of auxiliary machines and apparatus of inordinate proportions relative to the sizes and ratings of the induction machines to be controlled. Therefore, these arrangements become expensive. In addition, in each arrangement of these prior methods, it is necessary to reduce the voltage of the auxiliary direct current machine by adjusting the shunt field excitation, if the wound rotor induction machine is required to be controlled in a range of high speed near the synchronous speed. Accordingly in these cases, the result is that the available torque or the available output of the auxiliary direct current machine is reduced when controlled in a high speed range, and the available torque or output of the total machines is reduced.

The principal object of my invention is to provide control methods of systems affording wide speed ranges for wound rotor induction machines which shall be very simple and efficient in operation and which may be readily and economically manufactured and installed, by using an auxiliary direct current commutating machine which is electrically connected with the secondary winding of the main induction machine and whose rotor is mechanically coupled to that of the main induction machine.

The most important object of my invention is to provide control methods of systems in which the main induction machine can be controlled while the total torque or output combined of the main induction machine with the auxiliary direct current commutating machine is being kept high.

Another important object of my invention is to provide a control system by which many wound rotor induction machines coupled with direct current commutating machines can be controlled to have speeds different from each other by using other direct current commutating machines in common.

Still another important object of my invention is to provide a control system by which a wound rotor induction machine can be controlled as a generator.

A further object of my invention is to provide a control system by which speed of a wound rotor induction machine can be finely controlled as an element of an automatic speed control device.

Other objects of my invention will in part be obvious and in part appear hereinafter.

Accordingly, my invention is disclosed in the embodiments thereof shown in the accompanying drawings and comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description, taken in connection with the accompanying drawings, in which:

FIG. 3 illustrates diagrammatically still another embodiment of my invention.

FIG. 4 shows further embodiment of my invention.

In my invention, secondary output terminals of a wound rotor type induction machine are electrically connected, through a converter which we call the first converter, to the armature circuit of a direct current commutating machine whose rotor is mechanically coupled to the rotor of induction machine and there is provided another converter which we call the second converter, and has control elements. The main circuit of the second converter is electrically connected in series with the direct current side circuit of the first converter and the armature circuit of the said direct commutating machine. Further is provided a transformer of which a winding is electrically connected in series with the direct current side circuit of the first converter, the armature circuit of the said direct current commutating machine and the second converter and of which some terminals are electrically connected to the alternating current supply.

Figure 1:
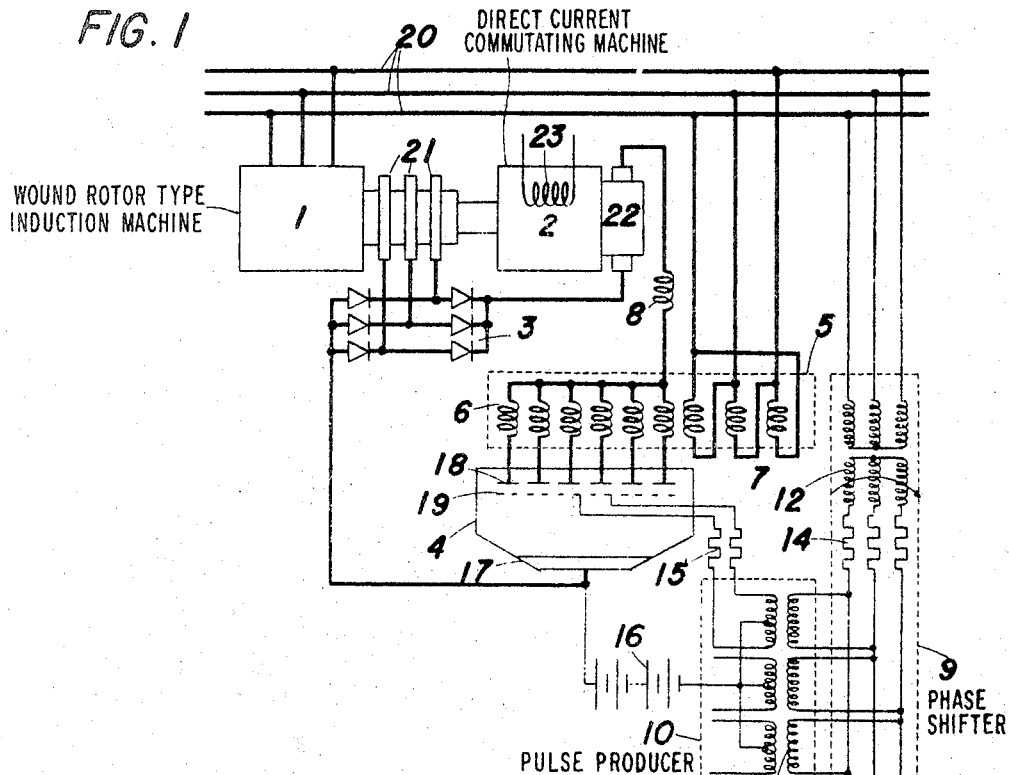
FIG. 1 illustrates diagrammatically one embodiment of my invention.

In FIG. 1, secondary output terminals 21 of a wound rotor type induction machine 1 are electrically connected, through the first converter 3, to the armature circuit 22 of the direct current commutating machine 2 whose rotor is mechanically coupled to the rotor of the induction machine 1. The second converter 4 has grids 19 acting as control elements. Mercury arc rectifier 4 is shown in FIG. 1 as the second converter. The symbols 18 and 17 show respectively anodes and cathode of the mercury arc rectifier 4. The main circuit of the mercury art rectifier 4 is electrically connected in series with the direct current side circuit of the first converter 3 and the armature circuit 22 of the said direct current commutating machine 2. In FIG. 1, the first converter 3 is composed of rectifiers, which may be semiconductor (for example silicon) rectifiers, electric valve rectifiers and so on. A winding 6 of a transformer 5 is electrically connected with the direct current side circuit of the first converter 3, the armature circuit 22 of the said direct current commutating machine 2 and the second converter 4. The other winding 7 of the transformer 5 is electrically connected to the alternating current bus 20 which supplies the induction machine 1 with electric power.

In FIG. 1, the grid control circuit of the mercury arc rectifier 4 contains a pulse voltage producer 10 composed of a pulse voltage transformer 11 and a phase shifter 9 composed of a transformer 12, resistors 14 and capacitors 13. The symbols 15 and 16 show respectively resistors and batteries for bias voltage. The symbol 8 shows a smoothing device or reactor.

As the grids art supplied with electric energy from the alternating current bus 20 through the phase shifter 9 and the pulse voltage producer 10, frequency of alternating current supplied on the grids 19 synchronizes or matches with frequency of alternating current in the winding 6 of the transformer 5 whose exciting current is supplied from the alternating current bus 20 through the winding 7. Therefore, firing of each anode 18 can be controlled by controlling the phase shifter 9 whose control can be controlled by adjusting the phase angle between the primary and the secondary winding of the transformer 12. In this circuit, the direct current source having the total direct current voltage of the direct current terminals of the first converter 3 combined with the terminal voltage of the direct current commutating machine 2 can supply power to the winding 6 of the transformer if the firing of each anode 18 takes place by the action of the phase shifter 9 when the voltages in the winding 6 of the transformer 5 are negative—that is, direction from anodes 18 to the winding 6. This forces currents through the legs of the winding 6 of the transformer 5 that are opposite to the direction of the voltages. Consequently, the winding 6 receives power from the source composed of the direct current terminals of the first converter 3 combined with the direct current commutating machine 2 and feeds it on to the winding 7 of the transformer 5. Thus, in this case, the combination of the second converter 4 with the transformer 5 operates as an inverter.

On the contrary, in this circuit, the transformer 7 can supply the direct current commutating machine 2 with electric power if the firing of each anode 18 takes place by the action of the phase shifter 9 when the voltages in the winding 6 of the transformer 5 are positive—that is, direction from the winding 6 to anodes 18. This forces currents through the legs of the winding 6 of the transformer 5 that are the same direction as of the voltages. Consequently, the winding 6 receives power from the alternating current bus 20 and feeds it on to the direct current commutating machine 2. Thus, in this case, the combination of the second converter 4 with the transformer 5 operates as a rectifying device.

Therefore, it can be said that the combination of the second converter 4 with the transformer 5 can be used as an inverter or a rectifying device by controlling the phase shifter 9 in the grid control circuit of the second converter 4. If voltage and current of each leg in the winding 6 of the transformer 5 are V and I respectively, and $\alpha$ is firing angle (phase angle between V and I), the winding 6 of the transformer 5 absorbs energy from the series circuit of the first converter 3 and the direct current commutating machine 2 when $\pi/2 < \alpha < \pi$ and can deliver power when $\alpha < \pi/2$. This firing angle $\alpha$ can be so controlled that it may be in the range either $\pi/2 < \alpha < \pi$ or $\alpha < \pi/2$ by the phase shifter 9. In other words, the combination of the mercury arc rectifier 4 with the transformer acts as an inverter when $\pi/2 < \alpha < \pi$, and acts as a rectifying device when $\alpha < \pi/2$.

When the combination of the mercury arc rectifier 4 with the transformer 5 is used as an inverter, the electric power is transferred from the secondary circuit of the wound rotor induction machine 1 or the armature circuit 22 of the direct current machine 2 to the alternating current bus 20 through the transformer 5. When the combination of the mercury arc rectifier 4 with the transformer 5 is used as a rectifying device, the electric power is transferred from the alternating current bus 20 to the armature circuit 22 of the direct current machine 2 through the transformer 5.

As the controlled angle of the mercury arc rectifier 4 can be controlled only by the phase shifter 9, the combination of the mercury arc-rectifier 4 with the transformer 5 can be controlled, only by the phase shifter 9, over a wide range: that is, from the range in which the combination of the mercury arc rectifier 4 with the transformer 5 acts as an inverter to the range in which the combination of the mercury arc rectifier 4 with the transformer 5 acts as an ordinary rectifying device.

If the combination of the mercury arc rectifier 4 with the transformer 5 is excluded from the arrangement of FIG. 1, the system becomes the Kraemer which consists of the wound rotor type induction machine 1, the direct current commutating machine 2 and the converter or rectifier 3. The characteristic obtained by such as arrangement of Kraemer becomes AB in FIG. 8, where abscissa shows revolution per minute of wound rotor induction machines, and ordinate shows the available output power of the motor or combined motors. The available output power of the wound rotor induction machine 1 in such Kraemer system is shown as AF in FIG. 8, and the available output power of the direct current commutating machine 2 is shown as ABF. Because, the speed of the wound rotor induction machine 1 is controlled by adjusting the current of the field winding 23, and the available output power of the direct current commutating machine 2 is reduced at speed near synchronous speed of the wound rotor induction machine 1.

On the contrary, the characteristic curve CBD can be obtained by the arrangement of FIG. 1 including the mercury arc rectifier 4 and the transformer 5. When the current of the field winding 23 of the direct current commutating machine 2 is kept constant at its maximum rating current during controlling the wound rotor induction machine 1, the characteristic line CB can be obtained by controlling only the control element or the phase shifter 9 of the mercury arc rectifier 4 which acts as an ordinary rectifying device. In this case, the direct current commutating machine 2 is supplied with a D.C. power from secondary output terminals 21 of the wound rotor induction machine 1 through the rectifiers 3 and from the alternating current bus 20 through the transformer 5.

Figure 8:
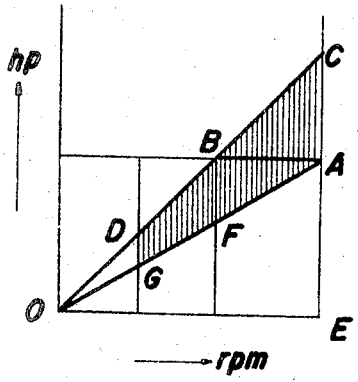
FIG. 8 represents a Speed-Output characteristic of the arrangement shown in FIG. 1.

When the currennt of the field winding 23 and the phase shifter 9 is so controlled that the direct current commutating machine 2 and the bus bar 20 can absorb the electric power from the secondary winding of the wound rotor induction machine 1 through the rectifier 3 and the transformer 5, the characteristic line BD in FIG. 8 can be obtained.

In this way, the wide range characteristic line CBD in FIG. 8 can be obtained by keeping the current of the field winding 23 at its maximum rating, and by controlling the control element or phase shifter 9 of the mercury arc rectifier 4 and thereby controlling the D.C. terminal voltage combining the second converter or rectifier 4 with the transformer 5 over the wide range from a positive value (the combination of the second converter or rectifier 4 with the transformer 5 acts as the ordinary rectifying device) to a negative value (the combination of the second converter or rectifier 4 with the transformer 5 acts as an inverter). In this case, the available output power of the wound rotor induction machine 1 is shown by AFG line in FIG. 8, and the available output power of the direct current commutating machine 2 is shown by the shade CBDGFA in FIG. 8.

As is understood from the above explanation, there are distinct differences between the arrangement of this invention and arrangements of prior methods of Kraemer system or derived from Kraemer system: and the arrangements of this invention has very much important advantages which cannot be obtained by the arrangements of the prior methods as follows:

(a) In some of prior arrangements derived from Kraemer system, there is provided an auxiliary D.C. motor connected to a converter unit comprising controlled rectifiers and to the secondary output of the induction motor, while rotors of the two machines are coupled. However, there is only one converter arrangement in the secondary circuit of the induction motor of the prior system while the arrangement of this invention has two converter arrangements. As the firing control means of the controlled rectifiers of the above prior methods operates only to limit the current fed from the secondary winding of the induction motor to the D.C. motor in the prior system, the available torque of the motor set is considerably reduced in a low speed range, although it becomes possible to control the motor set over a wide speed range.

(b) In some of other prior arrangements of Scherbius system, there is provided a rectifier and an inverter connected in series with each other between a secondary of an induction motor and an A.C. line which supplies a primary winding of the said induction motor. As the inverter operates only as an inverter and does not operate as a converter, in this prior arrangement, large capacity is required of the inverter if the induction motor can be controlled over a wide speed range.

(c) In the arrangement of this invention, there is provided an auxiliary D.C. commutating machine connected to a secondary output of an induction machine through a first converter while rotors of the two machines are coupled in the same manner as shown in the prior arrangement of Kraemer system, and further is provided a second converter having control elements and having main circuit electrically connected in series with a direct current side circuit of the said first converter and an armature of the said direct current commutating machine. Therefore, the arrangement of this invention is not only a combination of the prior Kraemer system with the prior Scherbius system, because in this invention, there is provided a second converter which supplies a D.C. commutating machine with electric power from an A.C. supply, on the contrary the inverter of the prior Scherbius system described above cannot operate as a converter.

(d) Therefore, in this invention, the wound rotor induction machine can be controlled over a wide speed range while the total torque or output of the main induction machine combined with the auxiliary direct current commutating machine is being kept high by utilizing efficiently the available torque or output of the auxiliary direct current commutating machine. The above advantage of this invention can be obtained owing to the operation of the second converter which can supply the direct current commutating machine with electric power from the alternating current bus 20, and cannot be obtained by arrangements of the prior methods either of Kraemer or Scherbius system explained above.

(e) In some of prior arrangements derived from Kraemer system, there is provided an auxiliary machine connected with a secondary output of an induction machine through controlled rectifiers while rotors of these two machines are coupled, and in some of other prior arrangements derived from Scherbius system, there are provided controlled rectifiers connected between a secondary winding of an induction machine and an A.C. line which is connected with a primary winding of the said induction machine. However, these controlled rectifiers cannot operate to supply the auxiliary machine coupled to the induction machine with electric power from the A.C. line without through the induction machine. Therefore, the advantage described above of this invention cannot be obtained by these prior arrangements.

In the arrangement of FIG. 1 explained until now, both the wound rotor induction machine 1 and the direct current commutating machine 2 operate as motors. But, the wound rotor induction machine 1 can be controlled as a motor by controlling the direct current commutating machine 2 as a direct current generator. In this case, the direct current commutating machine 2 is so arranged that it may be driven by the wound rotor induction machine 1 by controlling the direction and the magnitude of the current of the field winding 23, and the alternating current bus 20 absorbs electric power, through the transformer 5, from the secondary output terminals 21 of the wound rotor induction machine 1 and the direct current commutating machine 2.

If the direction of the terminal voltage of the direct current commutating machine 2 is same as that of the D.C. terminal voltage of the rectifier 3 (that is: the direction of the terminal voltage of the rectifier 3) when the field winding 23 is energized with a current whose direction is called positive direction, the direct current commutating machine 2 operates as a generator. In this case, the direct current commutating machine 2 is driven by the shaft of the wound rotor induction machine 1, and can supply the winding 6 of the transformer 5 with electric power. If the field winding 23 is energized with a current whose direction is opposite to the positive direction described above, the direction of the terminal voltage of the direct current commutating machine 2 becomes opposite to the D.C. terminal voltage of the rectifier 3 (this is: the direction of the terminal voltage differential to the terminal voltage of the rectifier 3) and the direct current commutating machine 2 operates as a motor. The terminal voltage of the direct current commutating machine 2 is called positive voltage when the machine 2 operates as a generator. On the contrary, it is called negative voltage when the machine 2 operates as a motor.

Figure 9:
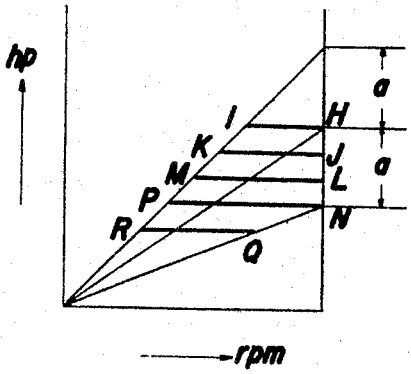
FIG. 9 represents another Speed-Output characteristic of the arrangement shown in FIG. 1.

When the direction and the magnitude of the current of the field winding 23 are controlled and thereby the terminal voltage of the direct current commutating machine 2 is controlled over the wide range from a positive voltage (the direct current commutating machine 2 operates as a generator) to a negative voltage (the direct current commutating machine 2 operates as a motor), the available total output power characteristics of the wound rotor induction machine 1 combined with the direct current commutating machine 2 are obtained over wide ranges, as HI, JK, LM, NP, RQ etc. shown in FIG. 9, where $a$ is the output power of the direct current commutating machine 2. Although it is well known, in general, that there are many methods of controlling or adjusting the direction and the magnitude of the current of the field winding 23, examples of these methods will be illustrated later in FIG. 3($a$) and FIG. 3($b$). When the primary winding of the wound rotor induction machine 1 is excited by reverse phase alternating current or by direct current, the wound rotor inducted machine 1 can be controlled as a generator driven by its load or its rotary inertia through the operation of the second converter 4 combined with the transformer which absorbs the electric power from the secondary output terminals 21 of the wound rotor induction machine 1 and the direct current commutating machine 2.

Figure 2:
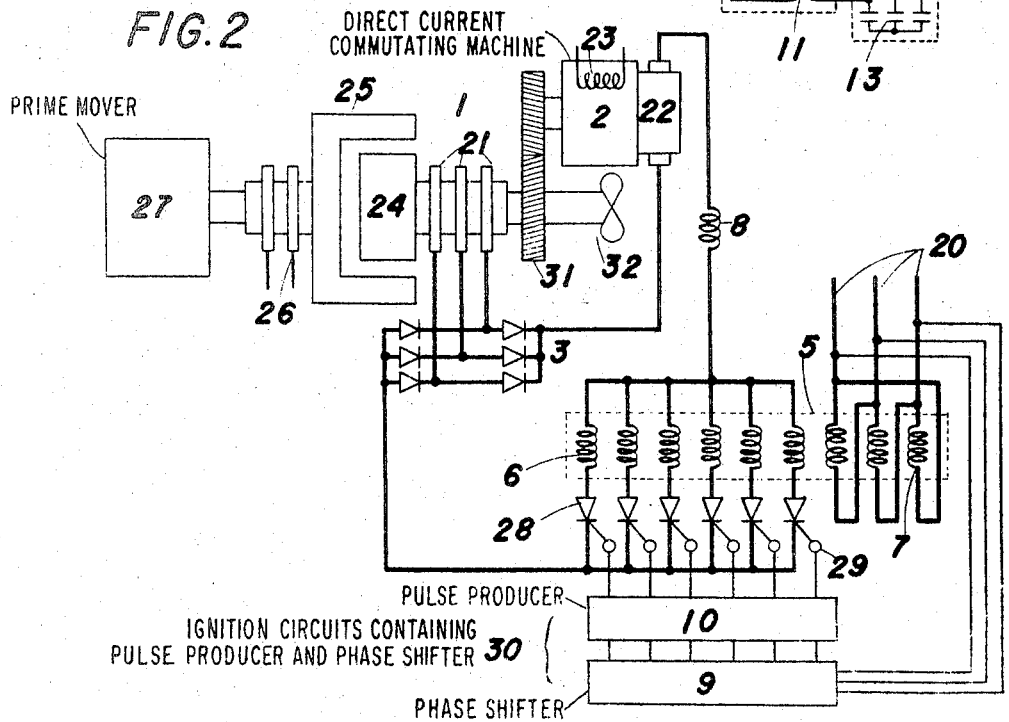
FIG. 2 illustrates diagrammatically another embodiment of my invention.

When an electric coupling is used as a wound rotor type induction machine, either the primary rotor or the secondary rotor is driven by the primary mover. In FIG. 2, the primary rotor 25 of the wound rotor type electric coupling 1 is driven by the prime mover 27, and is excited by a D.C. power through the terminals 26. The primary rotor 25 is wound by a direct current winding by which the stationary magnetic field can be produced with respect to the primary rotor 25. The secondary rotor 24 is wound by an alternating current winding in the same manner as of the wound rotor of an induction motor. Therefore, if the primary rotor 25 excited by a direct current is driven by the prime mover 27, a rotating flux which interlinks with the winding of the secondary rotor 24 is produced, therefore an alternating current voltage is induced in the winding of the secondary rotor 24. When an alternating current flows in the winding of the secondary rotor 24, the force produces between the rotating flux and the alternating current in the winding of the secondary rotor 24, therefore the secondary rotor 24 also rotates in the same direction as of the rotation of the primary rotor 25. The terminals 21 of the secondary rotor 24 are connected, through the first converter or rectifiers 3, to the armature circuit 22 of the direct current commutating machine 2 and the transformer 5 combined the second converter or semiconductor rectifiers 28. The rotor of the direct current commutating machine 2 is mechanically coupled to the secondary wound rotor 24 of the wound rotor type electric coupling 1 through a gear 31.

In FIG. 2, the torque transmitted from the prime mover 27 to the load 32 can be controlled. Even if the revolution of the prime mover 27 is approximately constant, the rotating speed of the load 32 can be controlled over a wide range by controlling either the current of the field winding of the direct current commutating machine 2 or the phase shifter 9. In FIG. 2, the symbol 29 shows terminals of control circuits of semiconductor rectifiers 28. The symbol 30 shows control (ignition) circuits which contain pulse producer 10 and a phase shifter 9. It is preferable that the current of the field winding 23 can be smoothly controlled over a wide range from the maximum positive value to the maximum negative value by adjusting a single device, in order to control the direct current commutating machine 2 from the range where it operates as a generator to the range where it operates as a motor.

Symbols 36 and 37 show resistors connected in series with each other to the field winding 23, and the symbols 32 and 33 show rectifiers which are connected to an alternating current bus 20.

The manner in which the adjustment of the current of the field winding 23 in this invention is illustrated by FIG. 3($a$) and FIG. 3($b$). As is understood from FIG. 3($a$), the voltage supplied on the terminals of the field winding 23 is approximately equal to the sum of the terminal voltage on the resistor 36 and the terminal voltage on the resistor 37. The direction of the terminal voltage on the resistor 36 is opposite to the direction of the terminal voltage on the resistor 37. When a variable resistor 35 is adjusted, the terminal voltage on the resistor 36 can be controlled, because the terminal of the resistor 36 is supplied with electric power from an alternating current bus 20 through a rectifier 32 and the variable resistor 35. If the resistance of the resistor 35 is adjusted to be large, the terminal voltage 36 becomes small, therefore the direction of the terminal voltage on the field winding 23 becomes the same as that of the terminal voltage of the resistor 37. Then if the value of the resistance of the resistor 35 is adjusted gradually to be smaller, the terminal voltage on or the current of the field winding 23 becomes gradually smaller, and when the terminal voltage of the resistor 37 becomes equal to that of the resistor 36, the terminal voltage on or the current of the field winding 23 becomes zero. If the value of the resistance of the resistor 35 is adjusted still to be further smaller, the direction of the terminal voltage supplied on the field winding 23 changes to the opposite direction, therefore the direction of the current of the field winding 23 changes also to the opposite direction. After that, if the value of the resistance of the resistor 35 is adjusted to be still further smaller, the current of the field winding 23 becomes gradually to be larger. Thus, the direction and the magnitude of the current of the field winding 23 can be controlled by adjusting only the variable resistor 35.

FIG. 3($b$), illustrating an example of a partial circuit for the field excitation, shows that a potentiometer 38 is connected across a D.C. supply 39, the potentiometer having a fixed tapping 40 and a variable tapping 41 between which the field winding 23 is connected, in order to provide variable excitation current for the field winding 23. By movement of the tapping 41 between the two ends of the potentiometer, the field excitation current to the winding 23 can be varied over a continuous range from a positive value to a negative value. The direction and the magnitude of the current of the field winding 23 is decided according to the direction and the magnitude of the voltage between the fixed tapping 40 and the variable tapping 41. Therefore if the tapping 41 moves from the right side range of the fixed tapping 40 to the left side range, the direction of the current of the field winding 23 changes. For instance, when the tapping 41 is connected with the right end of the potentiometer 38 and the current of the field winding 23 is positive maximum, the current becomes gradually smaller if the tapping 41 moves gradually toward the left side. When the tapping 41 moves across the fixed tapping 40, the direction of the current of the field winding 23 changes from a positive to a negative value. Then if the tapping 41 moves further toward the left side, the current of the field winding 23 becomes a larger negative value. Thus, it can be be said that the direction and the magnitude of the field winding 23 can be controlled by moving only the variable tapping 41.

FIG. 4 shows that a plurality of wound rotor type induction machines can be used. In FIG. 4, the transformer in series with the second converter or rectifier 4 is used in common by the plurality of wound rotor type induction machines 1, 38, converters or rectifiers 3, 40, and direct current commutating machines 2, 39. The D.C. circuit of the rectifier 3 is connected in series with the armature circuit of the direct current commutating machine 2. The D.C. circuit of the rectifier 40 is also connected in series with the armature circuit of the direct current commutating machine 39. The series circuit between the rectifier 3 and the direct current commutating machine 2 is connected in parallel with the other series circuit between the other rectifier 40 and the other direct current commutating machine 39, and is connected in series with the winding 6 of the transformer 5 and the rectifier 4. When the control (ignition) circuit 30 of the rectifier 4 is controlled, the plurality of the wound rotor induction machines 1 and 38 are simultaneously controlled. When the current of the field winding 23 or 41 of the direct current commutating machine 2 or 39 is controlled, the wound rotor type induction machine 1 or 38 is controlled independently of each other.

In FIG. 4, both or either the current of the field winding 23, 41 of the direct current commutating machines 2, 39, and/or the control (ignition) circuit 30 of the rectifier 4 can be controlled, thereby both or either the terminal voltage of these direct current commutating machines 2, 39 and/or the terminal voltage of the transformer winding 6 combined with the rectifier 4 can be controlled over continuous ranges from positive values to negative values.

Figure 5:
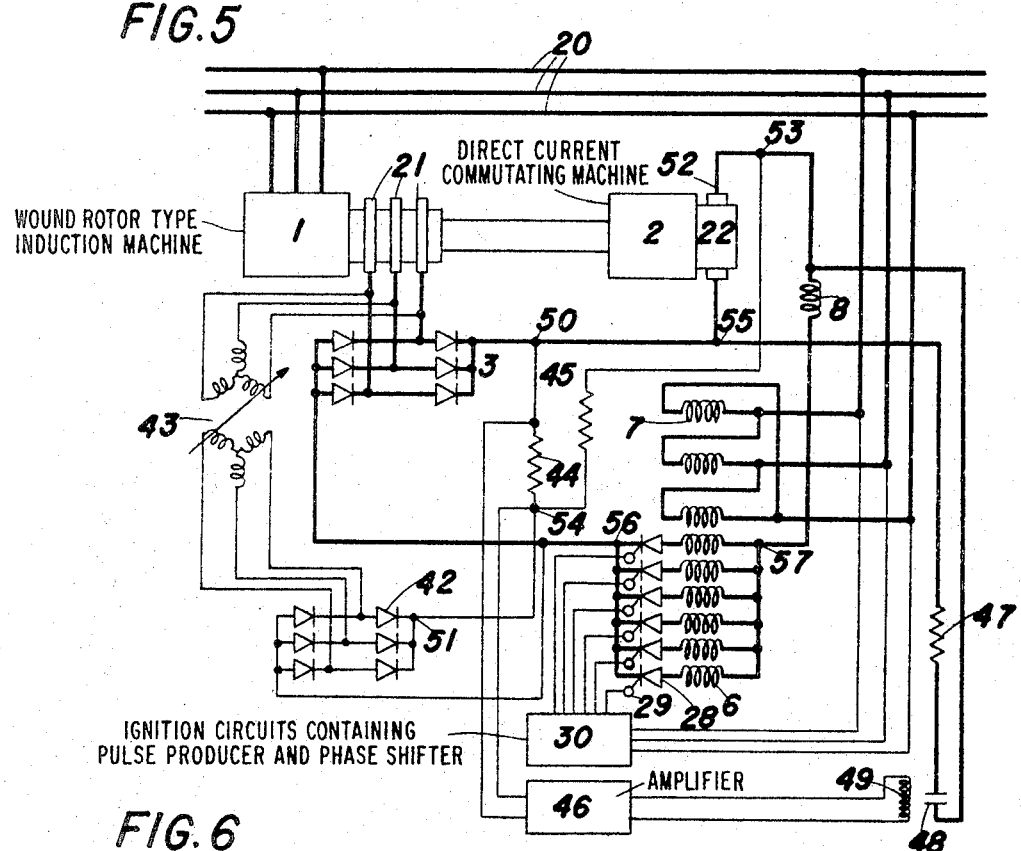
FIG. 5, FIG. 6 and FIG. 7 show still further embodiment of my invention.

FIG. 5 shows an example of application of this invention. In FIG. 5, the other rectifiers 42 than the first converter 3 are connected in parallel with the first converter 3 in the circuit of the output terminals of the secondary windings of the wound rotor type induction machine; one of the D.C. side terminals of the said rectifiers is electrically connected, through a first resistor 44, to one of the D.C. side terminals 50 of the first converter 3 by means of the connection in which the polarity of the connected terminal 51 of the said rectifiers 42 is the same as that of the first converter 3; a point 53 on the circuit between a terminal 52 for the armature circuit 22 of the direct current commutating machine 2 and the second converter 28 is electrically connected through a second resistor 45 to a point 54 on the circuit between the said terminal 51 of the said rectifiers 42 and the first resistor 44; and a switching apparatus 48 connected in series with a third resistor 47 which is connected in the circuit between the terminals 52, 55 of the armature circuit 22 of the direct current commutating machine 2 is arranged to be closed or opened by reversal of the polarity of the signal obtained by the terminal voltage drop of the first resistor 44.

The switching apparatus 48 is closed by energizing the closing coil 49. The symbol 46 shows an amplifier by which the signal obtained by the terminal voltage drop of the first resistor 44 is amplified to operate the closing coil 49. In the circuit between the secondary output terminals 21 of the wound rotor type induction machine 1 and the rectifiers 42 is connected a variable ratio transformer which is controlled in order to keep the D.C. terminal voltage of the rectifiers 42 higher than that of the first converter or rectifier 3.

We suppose that the D.C. side terminal voltage of the rectifier 3 is 100 v., and the D.C. side terminal voltage of the rectifiers 42 is 102 v. when the auxiliary direct current motor 2 is running under normal condition. Such D.C. side terminal voltage of the rectifiers 3 and 42 can be adjusted by controlling the variable transformer 43. The values of the resistances 44 and 45 are properly decided. Supposing the value of the resistance 44 is 1000 ohms, the power loss of the resistance 44 becomes 2 v.×0.002 a.=0.004 w.

Supposing the value of the resistance 45 is 1000 ohms, and the terminal voltage of the auxiliary direct current motor 2 is 80 v., the power loss of the resistance 45 becomes (102 v.−20 v.)²/1000 ohms=6.724 w., where 20 v. is the terminal voltage between the points 56 and 57 which is the combination of the transformer 6 and the rectifiers 28. Thus the voltage drop produced on the resistance 44 terminals becomes 2 v.

On the contrary, when the terminal voltage of the auxiliary direct current machine 2 becomes 84 v., the machines 2 and 1 must be braked. In this case, the total voltage of the D.C. side voltage 102 v. of the rectifiers 42 and the voltage 20 v. of the transformer 6 and the rectifiers 28 becomes 82 v.=102 v.−20 v. Therefore, the voltage drop on the resistance 44 becomes to have the polarity opposite to that obtained when the auxiliary direct current machine 2 runs in the normal condition. And the value of the voltage drop on the resistance 44 becomes 84 v.−82 v.=2 v.

Namely, the polarity of the voltage drop on the resistance 44 becomes the direction flowing from the point 54 to the point 50 when the auxiliary direct current machine 2 runs in the normal condition, and it becomes the direction flowing from the point 50 to the point 54 when the auxiliary direct current machine 2 must be braked, and furthermore the magnitude of the voltage drop in case of the positive polarity is almost the same as that in case of the negative polarity.

As is understood from the above explanation, it is important to compare the voltage of the rectifier 3 (between the points 50 and 56) with the voltage of the rectifier 42 (between the points 54 and 56) in this arrangement, when, it is required to shorten the time of an abnormal condition of the motor set 1–2. When the auxiliary direct current machine 2 runs in the normal condition, the voltage of the rectifier 42 (between the points 54 and 56) is higher than that of the rectifier 3 (between the points 50 and 56), but when the auxiliary direct current machine 2 runs in an abnormal condition, the voltage of the rectifier 42 becomes larger than that of the rectifier 3, because in the abnormal running condition of the auxiliary direct current machine 2, the total voltage of the terminal voltage of the machine 2 combined with the terminal voltage between the points 56 and 57 becomes larger than the D.C. terminal voltage of the rectifier 42. As, in this case, the terminal voltage of the direct current commutating machine 2 being relative to the quantity of the field flux multiplied by the speed is larger than that in the normal condition, the direct current commutating machine 2 must be braked in this abnormal condition. It is so arranged that the amplifier 46 does not operate to supply the closing coil 49 with electric power when the polarity of the voltage drop on the resistance 44 directs to the direction flowing from the point 54 to the point 50 but operates to supply the closing coil 49 with electric power when the polarity of the voltage drop on the resistance 44 directs to the direction flowing from the point 50 to the point 54. The switching apparatus 48 is so arranged that it may close when the closing coil 49 is energized. Consequently the switching apparatus 48 is kept open when the polarity of the voltage drop on the resistance 44 directs to the direction flowing from the point 54 to the point 50, but closes when the polarity of the voltage drop on the resistance 44 directs to the direction flowing from the point 50 to the point 54. Thus it will be found that the resistance 44 can be used as a detected resistance.

Therefore, when the resistance 44 is used as a detecting resistance, and the switching apparatus 48 is operated by the polarity of the voltage drop of the resistance 44, the braking action of the system is correctly done.

Figure 6:
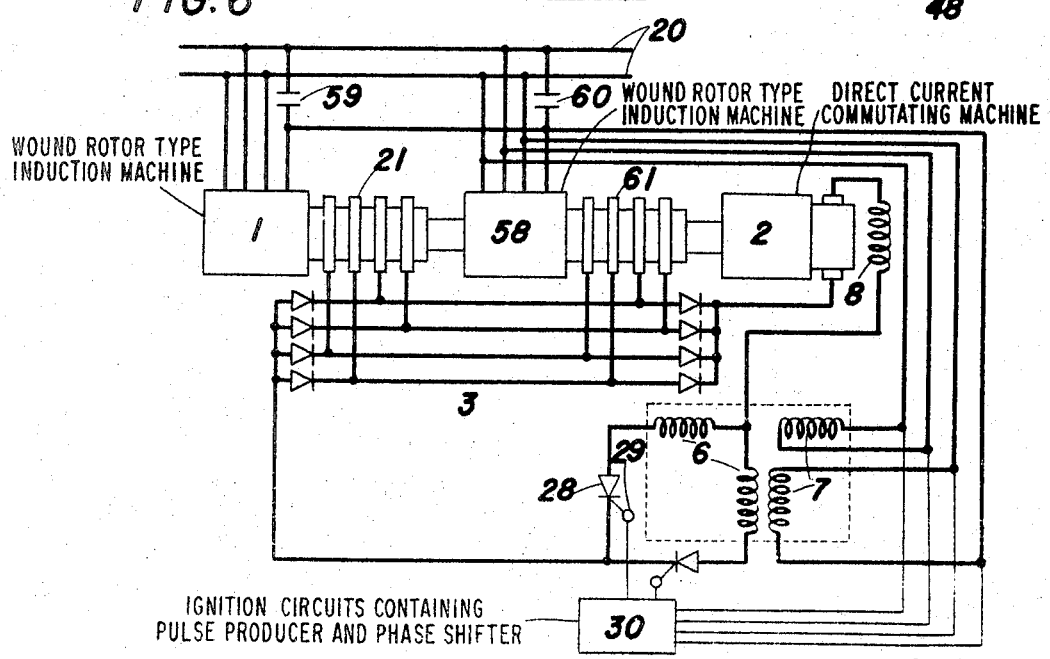

FIG. 6 shows further an example of the electric wiring diagram of this invention. In FIG. 6, the symbols 1 and 58 show two phase wound rotor type induction machines whose secondary output terminals 21 and 61 are respectively connected to the rectifiers 3, and whose primary windings are connected to the single phase alternating current bus 20. The symbols 59 and 60 are phase shifting condensers by which the two phases having rectangular phase difference with each other can be obtained.

When the system shown in FIG. 6 can be utilized to the electric railway car, the rotor of motors 1, 58 and 2 can be mechanically coupled with each other by the rail and wheels which are driven by these motors.

Figure 7:
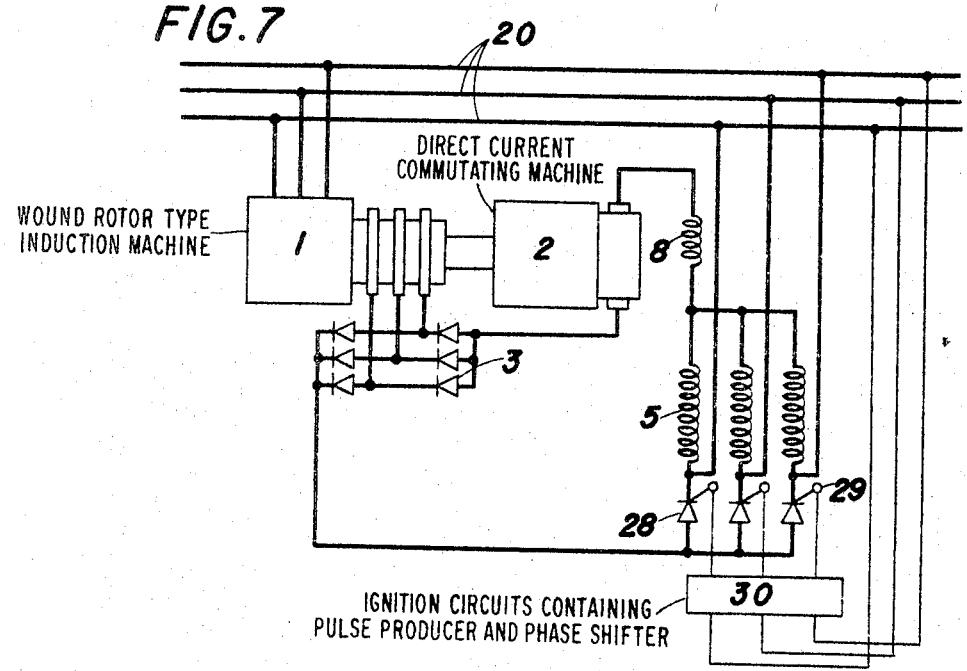

FIG. 7 shows that an autotransformer 5 can be used in this invention. The arrangement using such an autotransformer becomes very simple.

Finally, the explanation of this invention is added as follows.

As is explained above, a direct current machine can be used as a direct current commutating machine 2, and a wound rotor induction motor can be used as a wound rotor induction machine. This induction machine can be supplied through the primary winding from the alternating current bus either with A.C. power or with A.C. reverse phase power. As is shown in FIG. 6, another wound rotor type induction machine 58 than the machine 1 can be connected to the alternating current terminals of the first converter.

As is understood from the previous explanation and the arrangements shown in drawings, in this invention can be installed the control circuits for the control elements of the second converter by which electric power can be transferred from the output terminals of the secondary winding of the induction machine 1 to the alternating current bus 20 through the transformer 5 and to the direct current commutating machine 2 in the range of the low speed of the induction machine 1 and by which electric power can be transferred to the direct current commutating machine from the output terminals of the secondary winding of the induction machine and from the alternating current bus through the transformer in the range of the high speed of the induction machine 1.

In some cases of this invention are installed the control circuits for the control elements of the second converter by which electric power can be transferred from the alternating current bus to the direct current commutating machine through the transformer.

In some cases of this invention are installed the control circuits for the control elements of the second converter by which electric power can be transferred from the direct current commutating machine to the alternating machine through the transformer.

In some cases of this invention are installed the control circuits for the control elements of the second converter by which electric power can be transferred from the output terminals of the secondary windings of the induction machine to the alternating current bus through the transformer.

In some cases of this invention are installed the control circuits for the control elements of the second converter by which the terminal voltage of the series circuit composed of the second converter and the transformer can be controlled over a wide range from a positive to a negative by controlling the control circuits.

Having thus fully described by invention, what I claim as new, and desire to secure by Letters Patent is:

1. An electric control system for a wound rotor type induction machine have the combination of: a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; and a transformer of which a winding is electrically connected in series with the direct current side circuit of the said first converter, the armature circuit of the said direct current commutating machine and the said second converter, and of which some terminals are electrically connected to the alternating current supply.

2. An electric control system for a wound rotor type induction machine having the combination of: a first converter composed of rectifiers which are connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter composed of rectifiers having control elements and having main circuit electrically connected in series with the direct current side circuit of the said first converter and the armature circuit of the said direct current commutating machine; and a transformer of which a winding is electrically connected in series with the direct current side circuit of the said first converter, the armature circuit of the said direct current commutating machine and the said second converter, and of which some terminals are electrically connected to the alternating current supply.

3. An electric control system for a wound rotor type induction machine having the combination of; a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; a transformer of which a winding is electrically connected in series with the direct current side circuit of the said first converter, the armature circuit of the said direct current commutating machine and the said second converter, and of which some terminals are electrically connected to the alternating current supply; and control circuits for the said control elements of the second converter by which electric power can be transferred from the said alternating current bus to the said direct current commutating machine through the transformer.

4. An electric control ssytem for a wound rotor type induction machine having the combination of; a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; a transformer of which a winding is electrically connected in series with the direct current side circuit of the said first converter, the armature circuit of the said direct current commutating machine and the said second converter, and of which some terminals are electrically connected to the alternating current supply; and control circuits for the said control elements of the second converter by which electric power can be transferred from the said direct current commutating machine to the said alternating current bus through the transformer.

5. An electric control system for a wound rotor type induction machine having the combination of; a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circiut electrically connected in series with the direct current side circuit of the said first converter and the armature circuit of the said direct current commutating machine; a transformer of which a winding is electrically connected in series with the direct current side circuit of the said first converter, the armature circuit of the said direct current commutating machine and the said second converter, and of which some terminals are electrically connected to the alternating current supply; and control circuits for the control elements of the said second converter by which the terminal voltage of the series circuit composed of the second converter and the transformer can be controlled over a wide range from a positive to a negative by controlling the control circuits.

6. An electric control system for a wound rotor type induction machine having the combination of; a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; a transformer of which a winding is electrically connected in series with the direct current side circuit of the said first converter, the armature circuit of the said direct current commutating machine and the said second converter, and of which some terminals are electrically connected to the alternating current supply; and means and control circuits for the field excitation and terminal voltage of the direct current commutating machine which is controlled over a wide range from a positive voltage to a negative voltage by controlling the field excitation of the direct current commutating machine.

7. An electric control system for a wound rotor type induction machine having the combination of; a first converter which is connected in a circuit of output terminals of the secondary windings of the said induction machine called as a first induction machine; a direct current commutating machine called as a first direct current commutating machine having an armature circuit electrically connected in series with a direct current side circuit of the said first converter and having a rotor mechanically coupled to a rotor of the said first induction machine; a second converter having control elements and having main circuit electrically connected in series with the direct current side circuit of the said first converter and the armature circuit of the said first direct current commutating machine; a transformer of which a winding is electrically connected in series with the direct current side circuit of the said first converter, the armature circuit of the said first direct current commutating machine and the said second converter, and of which some terminals are electrically connected to the alternating current supply; another combination of a second wound rotor type induction machine with a second direct current commutating machine having an armature circuit electrically connected in series with a direct current side circuit of a third converter which is connected in a circuit of output terminals of the secondary windings of the second induction machine, and having a rotor mechanically coupled to a rotor of the said second induction machine; and the connection in which the second converter is electrically connected in series with the direct current side circuit of the said third converter and the armature circuit of the said second direct current commutating machine by connecting the series connection between the first direct current commutating machine and the D.C. side circuit of the first converter in parallel with the series connection between the second direct current commutating machine and the D.C. side circuit of the third converter.

8. An electric control system for a wound rotor type induction machine having the combination of; a first converter which is connected in a circuit of output terminals of the secondary windings of the said induction machine; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; a transformer of which a winding is electrically connected in series with the direct current side circuit of the said first converter, the armature circuit of the said direct current commutating machine and the said second converter, and of which some terminals are electrically connected to the alternating current supply; rectifiers connected in parallel with the first converter in the circuit of the output terminals of the secondary windings of the said wound rotor type induction machine; a first resistor through which one of the D.C. side terminals of the said rectifiers is electrically connected to one of the D.C. side termials of the first converter by means of the connection in which the pole of the connected terminal of the said rectifiers is the same as that of the first converter; a second resistor through which a point on the circuit between a terminal for the armature circuit of the direct current commutating machine and the second converter is electrically connected to a point on the circuit between the said terminal of the said rectifiers and the first resistor; and a third resistor which is connected in the circuit between the terminals of the armature circuit of the direct current commutating machine through a switching apparatus which is arranged to be closed or opened by reversal of the polarity of the signal obtained by the terminal voltage drop of the first resistor.

9. An electric control system for a wound rotor type induction coupling having the combination of; a first converter which is connected in a circuit of output terminals of the secondary windings of the said induction coupling; a direct current commutating machine having an armature circuit electrically connected in series with a direct current side circuit of the said first converter and having a rotor mechanically coupled to a rotor of the said induction coupling; a second converter having control elements and having main circuit electrically connected in series with the direct current side circuit of the said first converter and the armature circuit of the said direct current commutating machine; and a transformer of which a winding is electrically connected in series with the direct current side circuit of the said first converter, the armature circuit of the said direct current commutating machine and the said second converter, and of which some terminals are electrically connected to the alternating current supply.

10. An electric control system for a wound rotor type induction motor supplied through a primary winding from an alternating current bus with A.C. power, having the combination of; a first converter which is connected in a circuit of output terminals of the secondary windings of the said induction motor; a direct current commutating machine having an armature circuit electrically connected in series with a direct current side circuit of the said first converter and having a rotor mechanically coupled to a rotor of the said induction machine; a second converter having control elements and having main circuit electrically connected in series with the direct current side circuit of the said first converter and the armature circuit of the said direct current commutating machine; and a transformer of which a winding is electrically connected in series with the direct current side circuit of the said first converter, the armature circuit of the said second converter, and of which some terminals are electrically connected to the alternating current supply.

References Cited
UNITED STATES PATENTS

| | | | |
|---|---|---|---|
| 2,213,945 | 9/1940 | Alexanderson | 318—197 X |
| 2,236,984 | 4/1941 | Alexanderson | 318—197 |
| 2,285,182 | 6/1942 | Alexanderson | 318—197 |
| 2,288,338 | 6/1942 | Willis | 318—197 |
| 2,707,258 | 4/1955 | Boyer et al. | 318—197 |
| 3,136,937 | 6/1964 | Miljanic | 318—197 |

B. DOBECK, Primary Examiner

G. RUBINSON, Assistant Examiner

U.S. Cl. X.R.

318—237